United States Patent [19]
Mizuta et al.

[11] Patent Number: 5,926,935
[45] Date of Patent: Jul. 27, 1999

[54] METHOD OF AND APPARATUS FOR INCORPORATING TORSION SPRING

[75] Inventors: Akira Mizuta; Mitsuyoshi Okiyama, both of Kanagawa-ken, Japan

[73] Assignee: Fuji Photo Film Co., Ltd., Kanagawa-ken, Japan

[21] Appl. No.: 09/000,653

[22] Filed: Dec. 30, 1997

[30] Foreign Application Priority Data

Jan. 10, 1997 [JP] Japan .................................... 9-002736

[51] Int. Cl.⁶ ...................................................... B23P 11/02
[52] U.S. Cl. ................................. 29/446; 29/225; 29/227; 29/452; 29/450; 29/806; 29/896.9; 140/89; 267/135; 267/155
[58] Field of Search .............................. 29/225, 227, 452, 29/446, 450, 806, 896.9; 140/89; 267/137, 155

[56] References Cited

U.S. PATENT DOCUMENTS

4,959,897  10/1990  Ogawa et al. ............................. 29/227

*Primary Examiner*—P. W. Echols
*Assistant Examiner*—John Hong
*Attorney, Agent, or Firm*—Sughrue, Mion, Zinn, Macpeak & Seas, PLLC

[57] ABSTRACT

A torsion spring having a central coiled portion and a pair of resilient arms projecting from the coiled portion in different directions is incorporated in a workpiece so that the coiled portion is fitted on a support pin on the workpiece and the arms are engaged with first and second engagement portions on the workpiece. A center pin is inserted into the coiled portion of the torsion spring, and the coiled portion is held by attraction of an attracting portion provided around the center pin. A pair of forming pins are moved relative to the center pin in directions perpendicular to the longitudinal axis of the center pin to abut against the respective arms of the torsion spring and deflect them. Then, the torsion spring held by the attracting portion is moved to bring the end of the center pin into abutment against the top end of the support pin, and the attracting portion is moved toward the support pin so that the center pin is pushed away from the coiled portion and the support pin is inserted into the coiled portion, and the arms of the torsion spring are released from the forming pins and brought into engagement with the first and second engagement portions on the workpiece.

6 Claims, 8 Drawing Sheets

METHOD OF AND APPARATUS FOR INCORPORATING TORSION SPRING

BACKGROUND OF THE INVENTION

1. Field of the Invention

This invention relates to a method of and an apparatus for incorporating a torsion spring in a workpiece and more particularly, to a method of and an apparatus for automatically incorporating in a tape cassette a torsion spring which urges a brake member in a reel lock mechanism for preventing a reel from rotating.

2. Description of the Related Art

There has been known a torsion spring incorporating apparatus disclosed in Japanese Unexamined Patent Publication No. 61(1986)-121843. In the torsion spring incorporating apparatus, a guide member in the form of a sleeve is inserted into a coiled portion of a torsion spring, the coiled portion is fitted on a support pin on a workpiece by fitting the guide member on the support pin with the end portion of a first arm of the torsion spring held by a holding means and the torsion spring kept undeflected, the end portion of a second arm is brought into engagement with a first engagement portion of the workpiece, the holding means is rotated with the end portion of the first arm kept held by the holding means, thereby resiliently deflecting the torsion spring, and then the end portion of the first arm is brought into engagement with a second engagement portion of the work.

As the workpiece or device in which the torsion spring is to be incorporated, there has been known a tape cassette such as disclosed in Japanese Unexamined Patent Publication Nos. 1 (1989)-166386 and 3 (1991)-20833. The tape cassette is provided with a lock mechanism which prevents a reel from rotating so that the tape wound around the reel does not slacken when the tape cassette is not in use. The lock mechanism comprises gear teeth formed on the peripheral surface of the reel and a brake member which is adapted to be engaged with the gear teeth and is urged by a torsion spring toward the gear teeth.

However, incorporation of a torsion spring in the manner described above is disadvantageous in that the inner diameter of the coiled portion of the torsion spring must be larger than the outer diameter of the support pin at least by the wall thickness of the guide member and that complicated up and down actions and rotating actions are necessary in incorporation of the torsion spring, which makes it difficult to incorporate torsion springs at a high speed.

That is, the torsion spring comprises an annular coiled portion and a pair of resilient arms projecting from the coiled portion in different directions. When such a torsion spring is incorporated in a workpiece, the coiled portion must be fitted on a support pin and the arms must be in a resiliently deflected state in the incorporated state. Accordingly, the incorporating mechanism should have a function of holding the torsion spring, a function of resiliently deflecting the arms and a function of engaging the deflected arms with engagement portions. Those functions must be accomplished by a compact mechanism which can incorporate the torsion spring at a high speed.

In this point, the conventional torsion spring incorporating apparatus where one arm is first brought into engagement with an engagement portion on a workpiece and then the other arm is resiliently deflected, the incorporating action is complicated and takes a long time, which makes it difficult to increase the working efficiency. Further, since a guide member is first fitted on a support pin and the arms are rotated about the guide member, the inner diameter of the coiled portion of the torsion spring should be larger than the outer diameter of the guide member, which is larger than the outer diameter of the support pin, and accordingly a large incorporating space is required. Further, since the difference between the inner diameter of the coiled portion and the outer diameter of the support pin is large, there is generated a large play between the support pin and the coiled portion and there is a fear that action of the torsion spring on the brake member becomes unstable.

SUMMARY OF THE INVENTION

In view of the foregoing observations and description, the primary object of the present invention is to provide a method of and an apparatus for incorporating a torsion spring in which the torsion spring can be stably incorporated even if the difference between inner diameter of the coiled portion of the torsion spring and the outer diameter of the support pin on the workpiece is small and at the same time the torsion spring can be incorporated at a high speed with a simple automated incorporating action.

In accordance with the present invention, there is provided a method of incorporating a torsion spring having a central coiled portion and a pair of resilient arms projecting from the coiled portion in different directions so that the coiled portion is fitted on a support pin on a workpiece and the arms are engaged with first and second engagement portions on the workpiece, which method comprising the steps of inserting a center pin into the coiled portion of the torsion spring, holding the torsion spring by attraction of an attracting portion provided around the center pin, moving a pair of forming pins relative to the center pin in directions perpendicular to the longitudinal axis of the center pin to abut against the respective arms of the torsion spring and deflect them, moving the torsion spring held by the attracting portion to bring the end of the center pin into abutment against the top end of the support pin, moving the attracting portion toward the support pin so that the center pin is pushed away from the coiled portion and the support pin is inserted into the coiled portion, and releasing the arms of the torsion spring from the forming pins and bringing the arms into engagement with the first and second engagement portions on the workpiece.

It is preferred that the arms be deflected by the forming pins on the way to the support pin.

The apparatus for incorporating a torsion spring in accordance with the present invention comprises a center pin which can be inserted into the coiled portion of the torsion spring, an attracting portion which is provided around the center pin and attracts and holds the coiled portion of the torsion spring in which the center pin is inserted, and a pair of forming pins which are moved relative to the center pin in directions perpendicular to the longitudinal axis of the center pin to abut against the respective arms of the torsion spring and deflect them, and is characterized in that the attracting portion is movable relative to the center pin in the longitudinal direction thereof so that when the attracting portion and the center pin is moved toward the support pin with the torsion spring held by the attracting portion, the support pin is brought into abutment against the center pin and pushes the center pin rearward away from the coiled portion of the torsion spring, whereby the coiled portion is transferred from the center pin to the support pin.

For example, the attracting portion is formed on a second block which is movable up and down, the center pin is supported on the second block for up and down movement relative to the second block and is urged downward by a first spring, and the forming pins are supported on a first block to extend through the first block and to be movable up and down relative to the first block, are urged downward by a second spring, and are connected to an interlocking member which is disposed above the upper end of the center pin, the first block being movable in a direction perpendicular to the longitudinal axes of the forming pins to move the forming pins in the direction, so that as the second block is moved downward, the center pin is brought into abutment against the support pin on the work and is moved upward relative to the second block overcoming the force of the first spring while the attracting portion is kept moved downward together with the second block and transfers the torsion spring held thereby to the support pin, and the upper end portion of the center pin is brought into abutment against the interlocking member to move upward the interlocking member and the forming pins connected to the interlocking member in response to the upward movement of the center pin, thereby releasing the arms of the torsion spring from the forming pins.

It is preferred that the attracting portion attracts and holds the torsion spring under a suction force. Further, it is preferred that the upper end face of the support pin and the lower end face of the center pin are provided with inclined surfaces such that as the lower end face of the center pin is brought into abutment against the upper end face of the support pin, the center pin is automatically centered relative to the support pin.

In accordance with the present invention, since the torsion spring is incorporated in the workpiece with the coiled portion of the torsion spring held on the center pin by the attracting portion and the arms deflected by the forming pins, the torsion spring can be incorporated in the workpiece by a simple action like thrust, whereby the mechanism can be simple and the torsion spring can be incorporated at a high speed.

Further, since the coiled portion of the torsion spring is transferred to the support pin on the workpiece with the lower end face of the center pin in abutment against the upper end face of the support pin, the difference between the inner diameter of the coiled portion and the outer diameter of the support pin may be smaller as compared with the conventional system where the coiled portion is transferred to the support pin by use of a tubular guide member which is fitted on the support pin when transferring the torsion spring, whereby the space required to incorporate the torsion spring in the workpiece may be smaller and the torsion spring can be stably transferred to the support pin.

Further, when the arms of the torsion spring are deflected on the way from the torsion spring supply position to the workpiece, incorporation of the torsion spring can be effected in a shorter time. Further, when the attracting portion attracts and holds the torsion spring under a suction force, the mechanism can be simplified. Further, when the upper end face of the support pin and the lower end face of the center pin are provided with inclined surfaces such that as the lower end face of the center pin is brought into abutment against the upper end face of the support pin, the center pin is automatically centered relative to the support pin, the torsion spring can be surely incorporated in the workpiece even if the workpiece or the center pin is in a position deviated from a predetermined position.

DESCRIPTION OF THE PREFERRED EMBODIMENT

A torsion spring incorporating apparatus in accordance with an embodiment of the present invention will be described with reference to the drawings, hereinbelow. In this particular embodiment, the workpiece in which the torsion spring is to be incorporated is a tape cassette having a reel lock mechanism.

Figure 11:
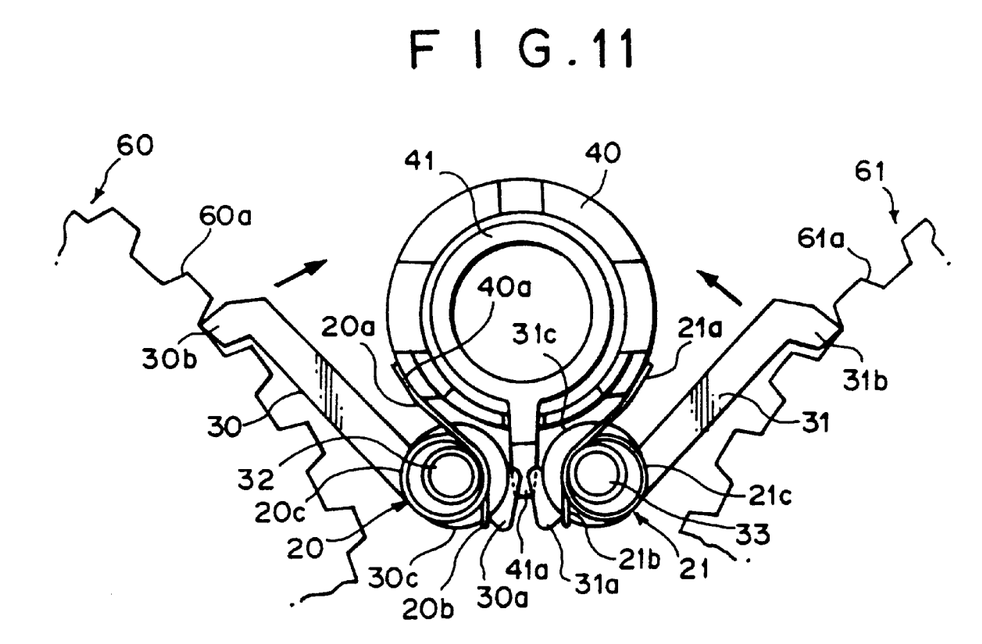
FIG. 11 is a fragmentary plan view showing the reel lock mechanism of a tape cassette, which is an example of the workpiece.

As shown in FIG. 11, the tape cassette has a pair of reels 60 and 61 around which a magnetic tape is wound. The reels 60 and 61 are contained in a casing. The reels 60 and 61 are provided with upper and lower flanges and gear teeth 60a and 61a are formed on the outer peripheries of the respective lower flanges. A pair of brake levers 30 and 31 are provided to prevent the tape wound around the reels 60 and 61 from slackening. That is, the brake levers 30 and 31 are supported for rotation about their one ends and are provided with hook portions 30b and 31b at their the other ends. The brake levers 30 and 31 are urged by torsion springs 20 and 21 in directions where the hook portions 30b and 31b are brought into engagement with the gear teeth 60a and 60b on the reels 60 and 61.

The brake levers 30 and 31 are symmetrical to each other and are provided with boss portions 30c and 31c at the other ends. The boss portions 30c and 31c are fitted on support pins 32 and 33 formed on the casing of the tape cassette, whereby the brake levers 30 and 31 are supported for rotation about the support pins 32 and 33. The torsion spring 20 (21) comprises a coiled portion 20c (21c) and first and second arms 20a and 20b (21a and 21b) projecting from the coiled portion 20c (21c). The boss portions 30c and 31c of the brake levers 30 and 31 are provided, at the portions facing each other, with second engagement portions 30a and 31a in the form of projections which are adapted to be engaged with the second arms 20b and 21b of the torsion springs 20 and 21.

The casing of the tape cassette is provided with a cylindrical portion 40 near the support pins 32 and 33. A release lever 41 is received in the cylindrical portion 40 to be slid in the longitudinal direction of the cylindrical portion 40 from outside the casing. The release lever 41 is provided with a tapered portion 41a which extends toward the second engagement portions 30a and 31a of the brake levers 30 and 31 and is adapted to be brought into abutment against the second engagement portions 30a and 31a.

When the release lever 41 is pushed upward, the tapered portion 41a is brought into abutment against the second engagement portions 30a and 31a and pushes them so that the brake levers 30 and 31 are rotated in such directions that the hook portions 30b and 31b on the brake levers 30 and 31 are disengaged from the gear teeth 60a and 61a on the reels 60 and 61 to permit rotation of the reels 60 and 61.

The coiled portions 20c and 21c of the torsion springs 20 and 21 are fitted respectively on the support pins 32 and 33 with the first arms 20a and 21a, which are longer than the second arms 20b and 21b, in engagement with a first engagement portion 40a on the outer peripheral surface of the cylindrical portion 40 and the second arms 20b and 21b in engagement with the second engagement portions 30a and 31a on the brake levers 30 and 31 in a resiliently deflected state, thereby urging the brake levers 30 and 31 toward the locking position where the hook portions 30b and 31b are engaged with the gear teeth 60a and 61a.

The torsion spring incorporating apparatus of this embodiment is for incorporating the torsion springs 20 and 21 in the tape cassette so that the coiled portions 20c and 21c are fitted on the support pins 32 and 33, the first arms 20a and 21a are engaged with the first engagement portions 40a and the second arms 20b and 21b are engaged with the second engagement portions 30a and 31a. Since the torsion springs 20 and 21 are symmetrical to each other, incorporation of only the left torsion spring 20 will be described, hereinbelow.

Figure 1:
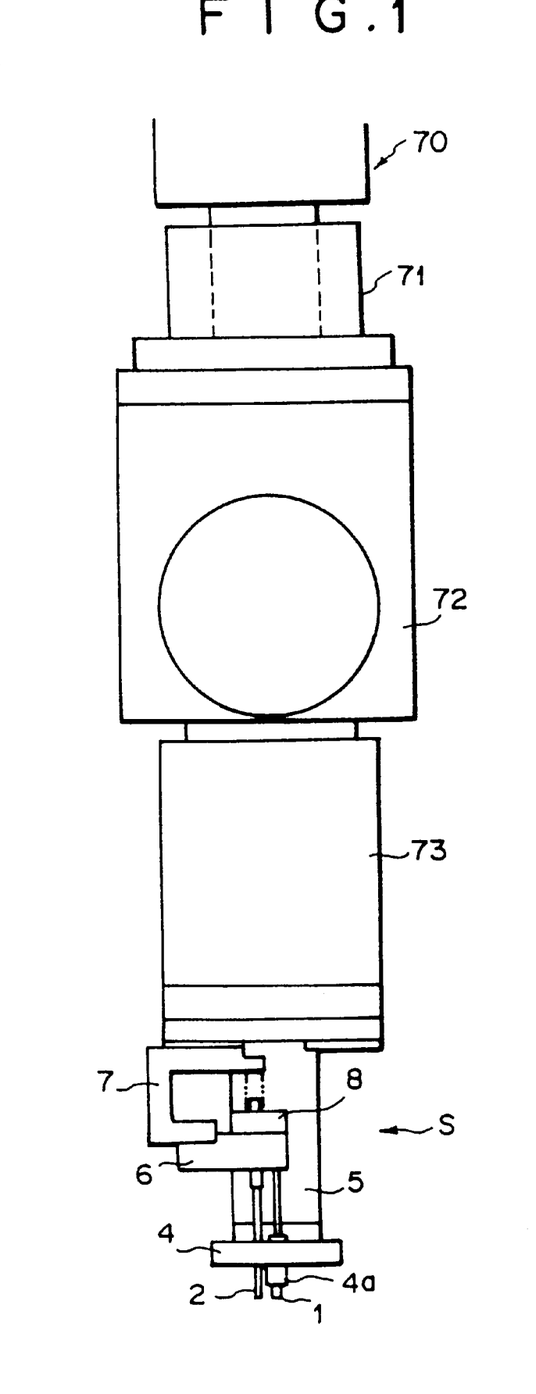
FIG. 1 is a schematic side view of a torsion spring incorporating apparatus in accordance with an embodiment of the present invention.
Figure 2:
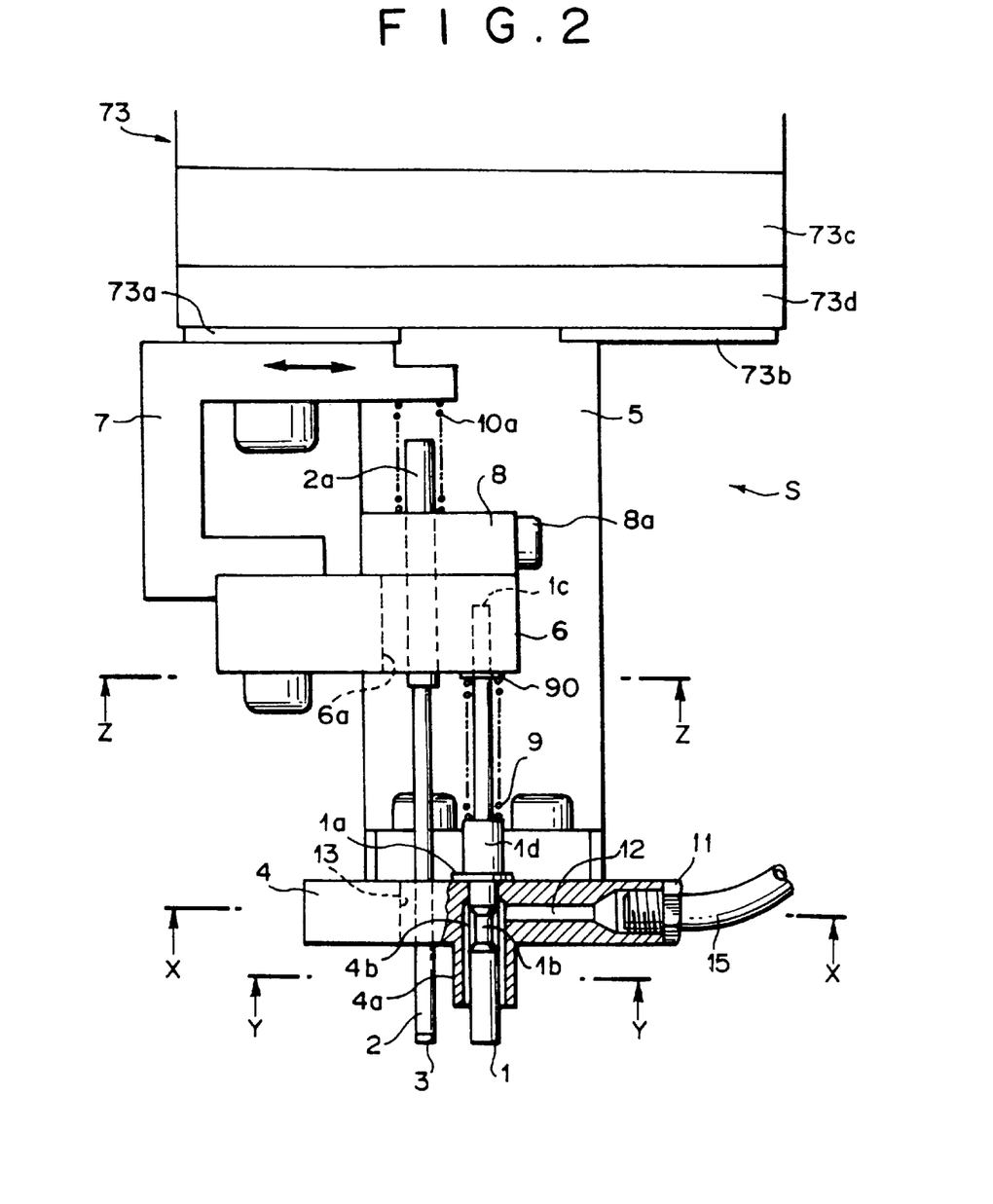
FIG. 2 is a fragmentary side view partly in cross-section showing in detail an important of the torsion spring incorporating apparatus.
Figure 3:
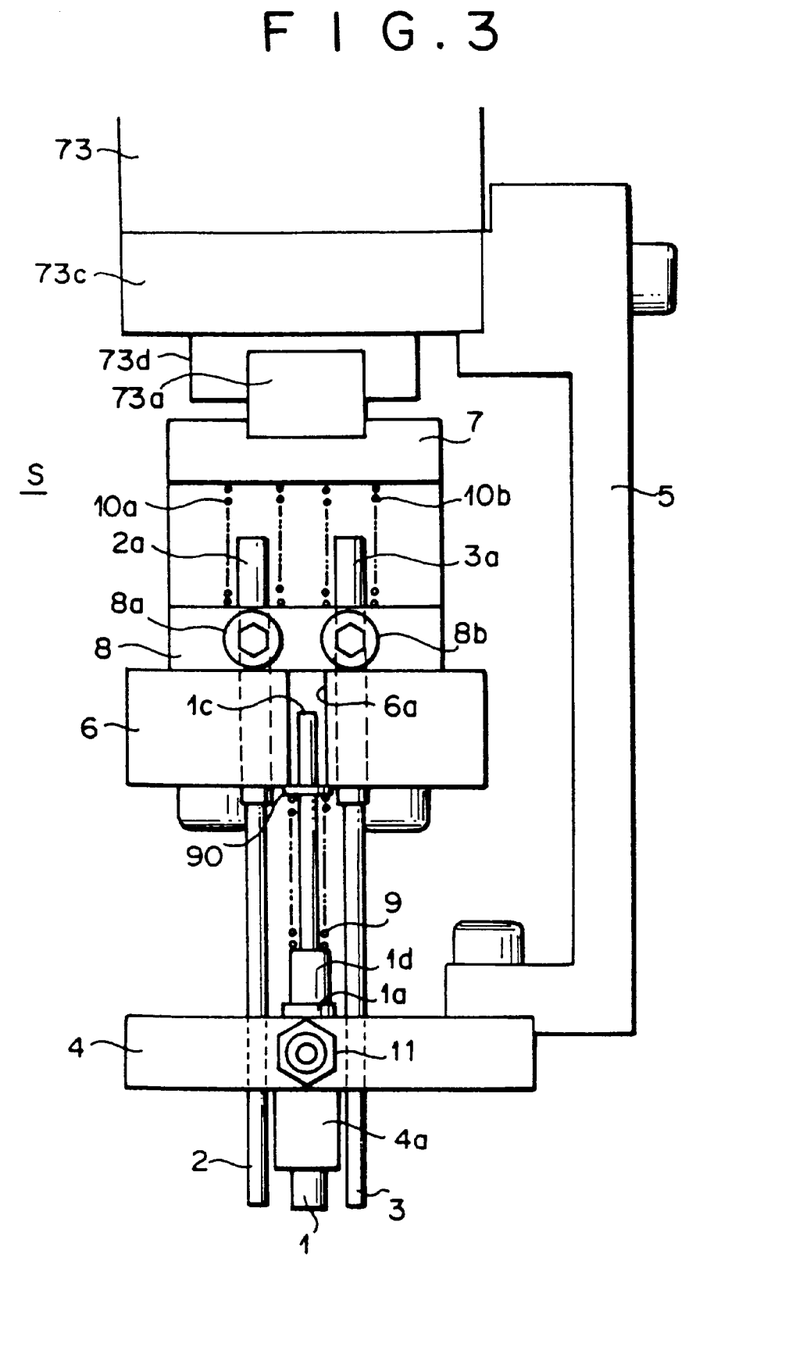
FIG. 3 is a fragmentary front view showing in detail an important part of the torsion spring incorporating apparatus.

In FIGS. 1 to 3, the total torsion spring incorporating apparatus is installed along a tape cassette assembly line. An incorporating mechanism S is mounted on the lower end portion of an apparatus body 70 by way of an adapter 71, a protective mechanism 72 and an actuator 73.

The apparatus body 70 may comprise a known pick and place mechanism or a known scalar robot for moving the incorporating mechanism S from a torsion spring supply position, in which torsion springs 20 are supplied, to an incorporating position in which the incorporating mechanism S incorporates the torsion spring 20 into a tape cassette.

The actuator 73 is provided with first and second mounting portions 73a and 73b which are moved back and forth along a guide portion 73d. A first mounting bracket 7 is fixed to the first mounting portion 73a at its upper end and a first block 6 is mounted on the lower portion of the first mounting bracket 7. A second mounting bracket 5 is fixed to a fixed side body 73 of the actuator 73 at its upper end. The second mounting bracket 5 extends downward beyond the lower end of the first block 6 and a second block 4 is mounted on the lower end portion of the second mounting bracket 5. The first and second blocks 6 and 4 are supported horizontally in parallel to each other and are moved up and down integrally with each other. The first block 6 is moved back and forth by the actuator 73. Further, the first block 6 is provided with a vertical slit 6a which penetrates the first block 6 in the vertical direction.

The second block 4 is provided with a central hole which penetrates the second block 4 in the vertical direction and a tubular attracting portion 4a is formed on the lower surface of the second block 4 so as to circumscribe the lower end of the central hole.

A center pin 1 extends through the second block 4 and the attracting portion 4a with a shoulder 1a formed at an intermediate portion of the center pin 1 in abutment against the upper surface of the second block 4. The center pin 1 is slidable up and down relative to the second block 4 and the attracting portion 4a. The lowermost position of the center pin 1 relative to the second block 4 and the attracting portion 4a is limited by abutment of the shoulder 1a and the upper surface of the second block 4. In the lowermost position where the shoulder 1a is in abutment against the upper surface of the second block 4, the lower end portion of the center pin 1 projects downward from the lower end of the attracting portion 4a by a predetermined length.

The upper end portion 1c of the center pin 1 extends into the vertical slit 6a of the first block 6 and a first spring 9 is compressed between a ring member 90 which is fitted on the upper end portion of the center pin and is in contact with the lower surface of the first block 6 and a spring seat 1d formed on the center pin 1 above the shoulder 1a. Thus, the center pin 1 is urged downward by the first spring 9. The ring member 90 is formed of a low friction material so that the center pin 1 can easily slide on the ring member 90 when the first block 6 is moved toward and away from the second block 4 as will be described later.

The attracting portion 4a attracts and holds the coiled portion 20c of the torsion spring 20 under a suction force. A suction hole 4b formed between the inner surface of the attracting portion 4a and the outer surface of the center pin 1 opens at the lower end face of the attracting portion 4a. The suction hole 4b is connected to a vacuum source (not shown) through an air passage 12 formed in the second block 4 and an air hose 15 which is connected to the air passage 12 through an air nipple 11.

Figure 5:
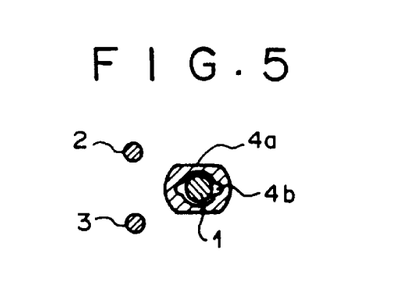
FIG. 5 is a cross-sectional view taken along line Y—Y in FIG. 2.
Figure 6:
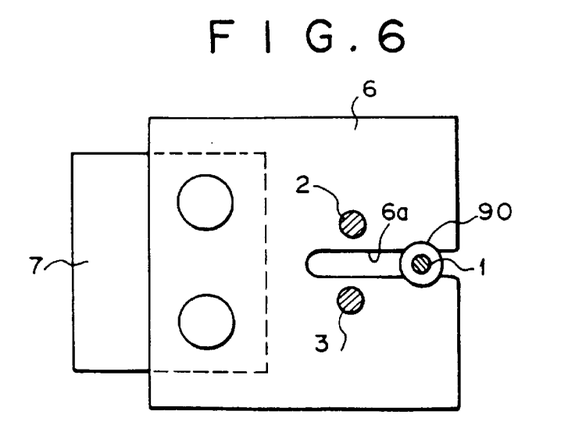
FIG. 6 is a cross-sectional view taken along line Z—Z in FIG. 2, FIGS. 7A to 7D are views for illustrating the procedure of mounting the torsion spring on the incorporating mechanism.

The center pin 1 is provided with a small diameter portion 1b at a portion opposed to the air passage 12. Further, as shown in FIG. 5, the suction hole 4b has a pair of U-shaped grooves which are diametrically opposed to each other and open at the lower end face of the attracting portion 4a.

First and second forming pins 2 and 3 (FIG. 3) are disposed on opposite sides of the center pin 1 to extend in the vertical direction. The forming pins 2 and 3 are thicker in their upper portion than their lower portion and extend upward through holes formed in the first block 6 to be slidable relative to the first block 6. The upper end portions of the forming pins 2 and 3 projecting above the first block 6 are fixed to an interlocking member 8 in the form of a plate by bolts 8a and 8b.

The interlocking member 8 is moved up and down together with the forming pins 2 and 3. A pair of second springs 10a and 10b are respectively fitted on the upper end portions 2a and 3a of the forming pins 2 and 3 and are compressed between the lower surface of the first mounting bracket 7 and the upper surface of the interlocking member 8. The second springs 10a and 10b urge downward the interlocking member 8 and accordingly the forming pins 2 and 3. The lowermost positions of the forming pins 2 and 3 are limited by abutment of the lower surface of the interlocking member 8 and the upper surface of the first block 6. When the first block 6 is moved back and forth, the forming pins 2 and 3 are moved back and forth.

Figure 4:
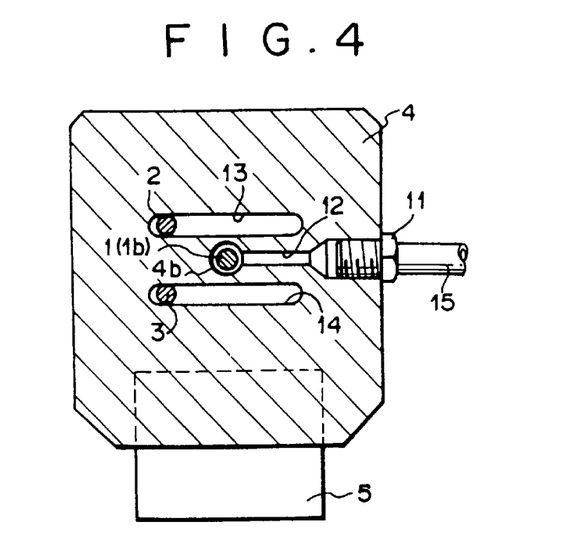
FIG. 4 is a cross-sectional view taken along line X—X in FIG. 2.
Figure 9:
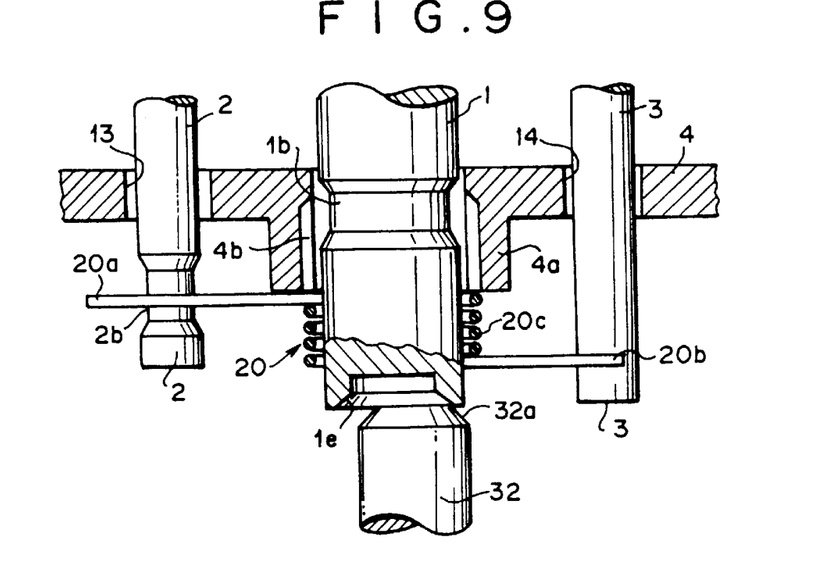
FIG. 9 is a fragmentary front view partly in cross-section showing in detail an important part of the torsion spring incorporating apparatus.

The lower end portions of the forming pins 2 and 3 extend through elongated holes 13 and 14 (FIG. 4) formed in the second block 4 on opposite sides of the attracting portion 4a so that the forming pins 2 and 3 are movable back and forth relative to the second block 4. The lower ends of the forming pins 2 and 3 are substantially at the same level as the lower end of the center pin 1. As shown in FIG. 9, the lower end portion of the first forming pin 2 is shorter than that of the second forming pin 3 and is provided with a recessed small diameter portion 2b for catching the first arm 20a of the torsion spring 20.

Further, as shown in FIG. 9, a countersink having an inclined surface in flaring downward at about 30° to 45° is formed on the lower end face of the center pin 1 while the upper end portion of the support pin 32 is tapered (32a) at about 30° to 45°. With this arrangement, even if the center pin 1 and the support pin 32 are out of alignment, they can be automatically centered relative to each other as the center pin 1 is moved toward the support pin 32 and the inclined surface 1e is brought into abutment against the tapered surface 32a of the support pin 32.

That is, the inner diameter of the coiled portion 20c of the torsion spring 20, the outer diameter of the center pin 1 and the outer diameter of the support pin 32 become smaller in this order. However, the difference between the inner diameter of the coiled portion 20c and the outer diameter of the support pin 32 cannot be so large due to a limitation in the structure of the tape cassette and the like. Accordingly, the outer diameter of the center pin 1 cannot be too much larger than the outer diameter of the support pin 32 and the difference therebetween is set, for instance, at 0.2 mm. For the viewpoint of ensuring accuracy in position control, the centering system described above is suitable.

A procedure of incorporating the torsion spring 20 will be described, hereinbelow. FIGS. 7A to 7D show procedure of holding the torsion spring 20 and deflecting the arms 20a and 20b. In each of FIGS. 7A to 7D, a plan view is shown on the upper side and a front view is shown on the lower side.

Figure 7A:
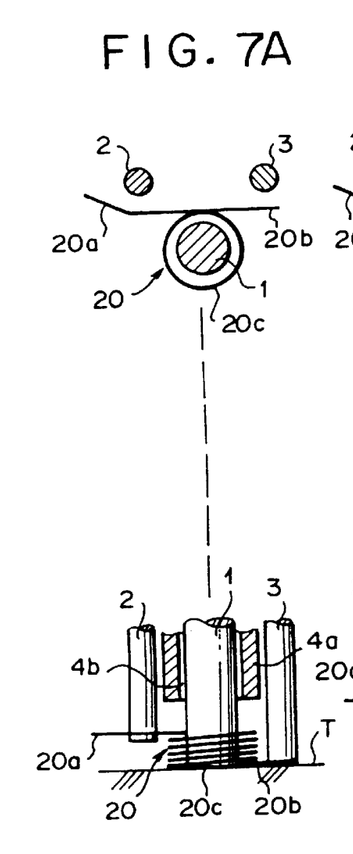

A single torsion spring 20 is placed on a table T in a predetermined position. Then, the center pin 1 and the forming pins 2 and 3 are moved downward from above the torsion spring 20 so that the center pin 1 is inserted into the coiled portion 20a of the torsion spring 20 as shown in FIG. 7A. At this time, the forming pins 2 and 3 are positioned away from the arms 20a and 20b of the torsion spring 20 with the arms 20a and 20b intervening between the forming pins 2 and 3 and the center pin 1.

Figure 7B:
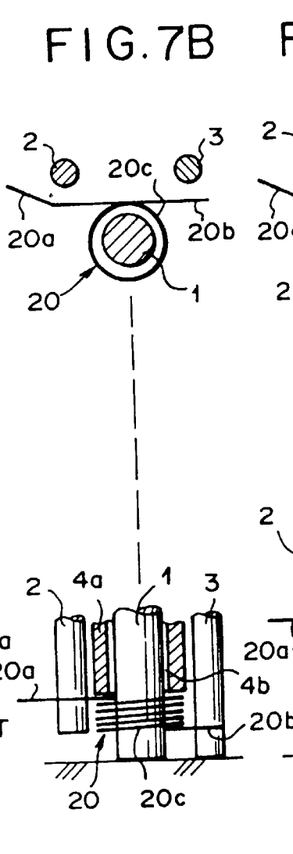

Then, vacuum is supplied to the suction hole 4b of the attracting portion 4a on the second block 4, whereby the torsion spring 20 is attracted on the lower end face of the attracting portion 4a as shown in FIG. 7B. In this state, since the forming pins 2 and 3 are not in contact with the torsion spring 20, the torsion spring 20 can be easily attracted under a suction force.

Figures 7C, 7D:
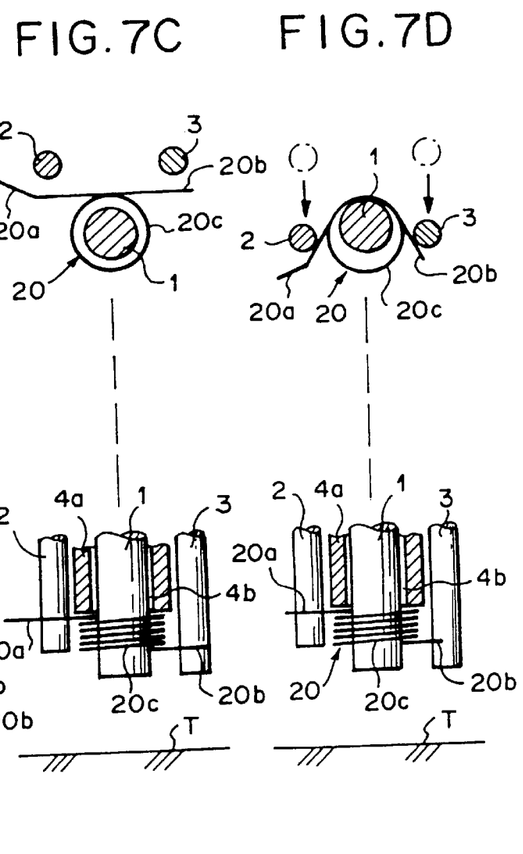

Then, the incorporating mechanism S is moved upward and then moved horizontally toward the workpiece, i.e., the tape cassette as shown in FIG. 7C. On the way to the tape cassette, the forming pins 2 and 3 are moved toward the center pin 1 by a predetermined distance by the actuator 73 through the first block 6, whereby the lower end portions of the forming pins 2 and 3 are brought into abutment against the arms 20a and 20b to deflect them as shown in FIG. 7D.

Figure 10:
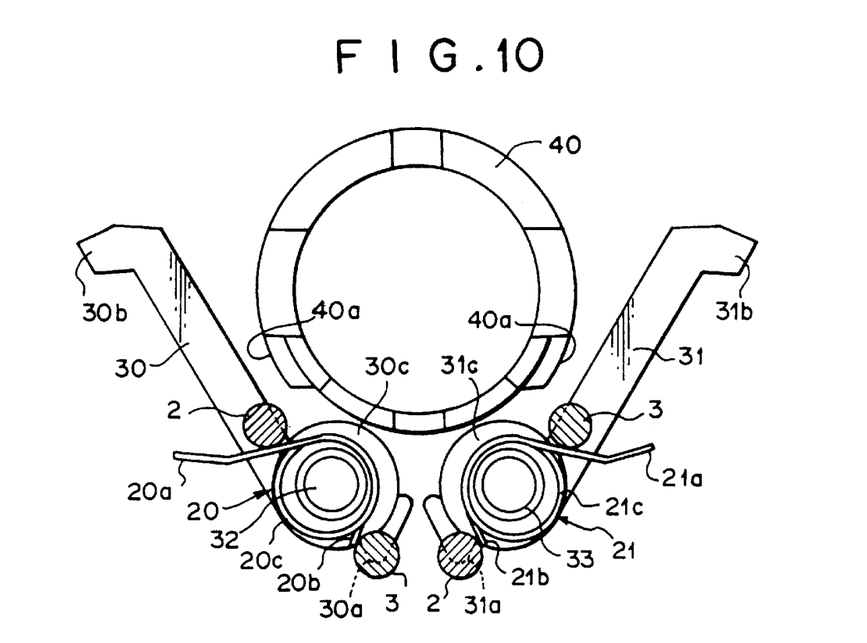
FIG. 10 is a view showing the position of the forming pins relative to the workpiece during incorporation.

Thus, the incorporating mechanism S is moved to a predetermined position relative to the tape cassette where the center pin 1 is positioned above the support pin 32. At this time, the forming pins 2 and 3 are positioned as shown in FIG. 10. That is, the second forming pin 3 is above the second engagement portion 30a and the first forming pin 2 is short of the first engagement portion 40a on the cylindrical portion 40.

In this state, the incorporating mechanism S is moved downward and incorporates the torsion spring 20 in the following manner.

Figure 8A:
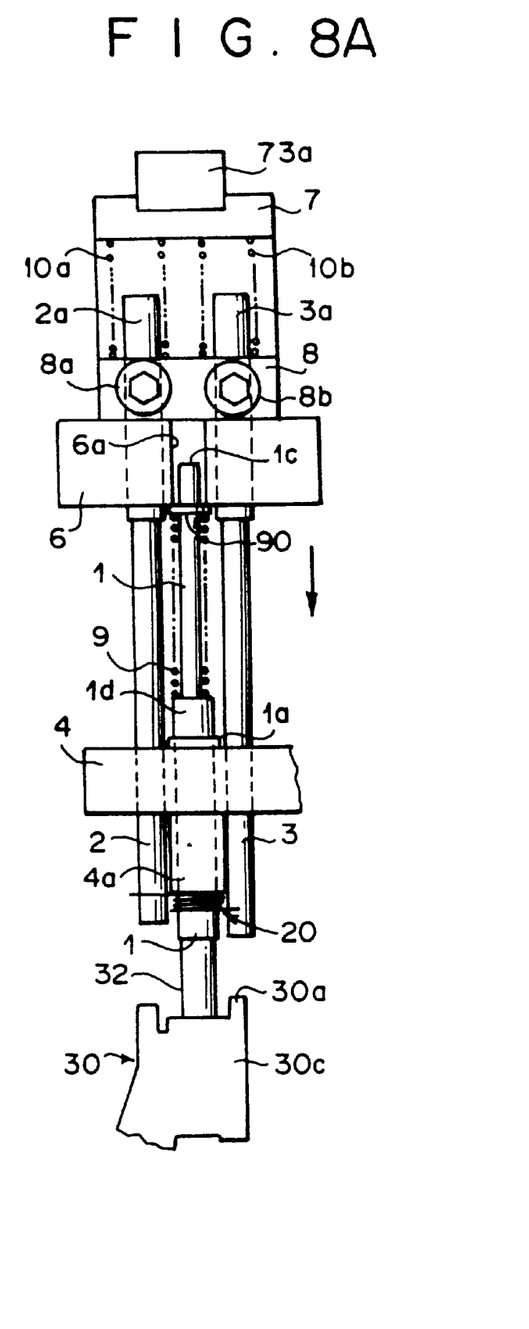
FIGS. 8A and 8B are views for illustrating the procedure of incorporating the torsion spring in the workpiece.

As the incorporating mechanism S is moved downward, the lower end face of the center pin 1 is first brought into abutment against the upper end face of the support pin 32 as shown in FIG. 8A, whereby the center pin 1 is centered relative to the support pin 32 as described above with reference to FIG. 9. As the incorporating mechanism S is further moved downward, the downward movement of the center pin 1 is prevented by the support pin 32 which is fixed.

Accordingly, as the first and second blocks 6 and 4 are moved downward, the center pin 1 is moved upward relative to the first and second blocks 6 and 4 compressing the first spring 9 while the upper end portion 1c of the center pin 1 is moved upward through the vertical slit 6a of the first block 6. At the same time, the attracting portion 4a moves downward the coiled portion 20c of the torsion spring 20 along the center pin 1 and transfers the coiled portion 20c to the support pin 32 while the attracting portion 4a receives therein the upper end portion of the support pin 32.

Figure 8B:
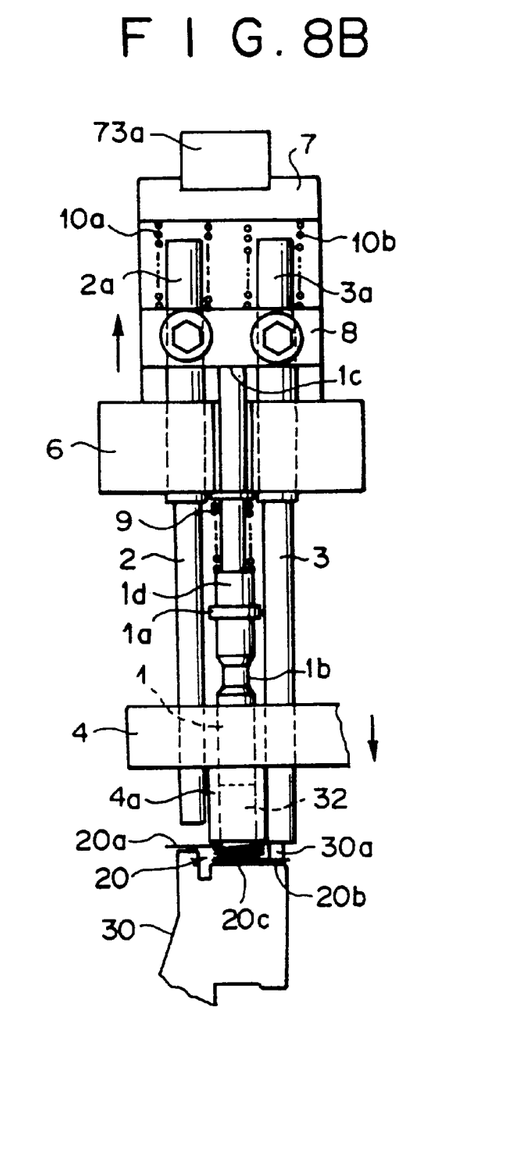

In response to further downward movement of the incorporating mechanism S, the upper end portion 1c of the center pin 1 pushes upward the interlocking member 8 and moves upward the forming pins 2 and 3 as shown in FIG. 8B. Thus the first and second arms 20a and 20b of the torsion spring 20 are released respectively from the first and second forming pins 2 and 3 and engage respectively with the first and second engagement portions 40a and 30a under their resiliency.

Since the second forming pin 3 is brought into contact with the second engagement portion 30a before the second arm 20b is released therefrom, the second arm 20b can be surely engaged with the second engagement portion 30a. Further, since the lower end of the first forming pin 2 has been moved below the upper end of the cylindrical portion 40 by the time the first arm 20a is released from the first forming pin 2, the first arm 20a can be surely engaged with the first engagement portion 40a.

Further, by the small diameter portion 2b on the lower end portion of the first forming pin 2, the first arm 20a of the torsion spring 20 is held so as not to be disengaged from the first forming pin 2 before the coiled portion 20c is transferred to the support pin 32.

If there is a sufficient space in the workpiece around the portion where the torsion spring 20 is to be incorporated, the forming pins 2 and 3 may be moved away from the center pin 1 to release the arms 20a and 20b at the time the coiled portion 20c is transferred to the support pin 32.

The right torsion spring 21 may be incorporated in the similar manner by changing the position of the torsion spring in which it is held by the attracting portion 4a and exchanging the forming pins 2 and 3.

By combining an image recognizing system and a scalar robot, an orthogonal robot or the like, torsion springs can be picked up in a predetermined position one by one from a plurality of torsion springs scattered in random so long as they are not positioned one on another and can be incorporated by the method of the present invention.

The present invention can be applied to incorporation of a torsion spring, having a coiled portion and a pair of arms projecting from the coiled portion in different directions, into other types of tape cassettes or other products so long as the torsion spring is incorporated in the product so that the coiled portion is fitted on a support pin and the arms are engaged with respective engagement portions.

What is claimed is:

1. A method of incorporating a torsion spring having a central coiled portion and a pair of resilient arms projecting from the coiled portion in different directions so that the coiled portion is fitted on a support pin on a workpiece and the arms are engaged with first and second engagement portions on the workpiece, the method comprising:

inserting a center pin into the coiled portion of the torsion spring,     holding the torsion spring by an attraction force provided by an attracting portion which is provided around the center pin,     moving a pair of forming pins relative to the center pin in a direction perpendicular to the longitudinal axis of the center pin to abut against the respective arms of the torsion spring and deflect them,     moving the torsion spring held by the attracting portion to bring the end of the center pin into abutment against the top end of the support pin,     moving the attracting portion toward the support pin so that the center pin is pushed away from the coiled portion and the support pin is inserted into the coiled portion, and     releasing the arms of the torsion spring from the forming pins and bringing the arms into engagement with the first and second engagement portions on the workpiece.

2. A method of incorporating a torsion spring as defined in claim 1 in which the arms of the torsion spring are deflected by the forming pins during movement of the torsion spring from an initial position to a position of the support pin of the workpiece.

3. An apparatus for incorporating a torsion spring having a central coiled portion and a pair of resilient arms projecting from the coiled portion in different directions so that the coiled portion is fitted on a support pin on a workpiece and the arms are engaged with first and second engagement portions on the workpiece, said apparatus comprising:

a center pin which is operative to be inserted into the coiled portion of the torsion spring,     an attracting portion which is provided around the center pin and produces an attraction force to attract and hold the coiled portion of the torsion spring in which the center pin is inserted, and     a pair of forming pins which are moved relative to the center pin in a direction perpendicular to the longitudinal axis of the center pin to abut against the respective arms of the torsion spring and deflect them,     the attracting portion being operative to move relative to the center pin in the longitudinal direction thereof so that when the attracting portion and the center pin are moved toward the support pin with the torsion spring held by the attracting portion, the support pin is brought into abutment against the center pin and pushes the center pin to exit from the coiled portion of the torsion spring, whereby the coiled portion is transferred from the center pin to the support pin.

4. An apparatus for incorporating a torsion spring as defined in claim 3 in which the attracting portion is formed on a second block which is movable up and down,     the center pin is supported on the second block for up and down movement relative to the second block and is urged downward by a force of a first spring, and     the forming pins are supported on a first block to extend through the first block and to be movable up and down relative to the first block, are urged downward by a second spring, and are connected to an interlocking member which is disposed above an upper end portion of the center pin, the first block being movable in a direction perpendicular to the longitudinal axes of the forming pins to move the forming pins in the direction,     whereby as the second block is moved downward, the center pin is brought into abutment against the support pin on the workpiece and is moved upward relative to the second block overcoming the force of the first spring while the attracting portion continues moving downward together with the second block and transfers the torsion spring held thereby to the support pin, and the upper end portion of the center pin is brought into abutment against the interlocking member to move upward the interlocking member and the forming pins connected to the interlocking member in response to the upward movement of the center pin, thereby releasing the arms of the torsion spring from the forming pins.

5. An apparatus for incorporating a torsion spring as defined in claim 3 in which the attracting portion attracts and holds the torsion spring under a suction force.

6. An apparatus for incorporating a torsion spring as defined in claim 3 in which an upper end face of the support pin and a lower end face of the center pin are provided with inclined surfaces such that as the lower end face of the center pin is brought into abutment against the upper end face of the support pin, the center pin is automatically centered relative to the support pin.

* * * * *